Oct. 18, 1966  G. E. SMELCER ETAL  3,279,831
TRACTOR WHEEL MOUNTING
Filed Nov. 23, 1964  2 Sheets-Sheet 1

Inventors:
Glen E. Smelcer
Earl K. Pederson
Donald R. Hartdegen
By Walter T. Ziolko Oct. 18, 1966 — G. E. SMELCER ETAL — 3,279,831
TRACTOR WHEEL MOUNTING
Filed Nov. 23, 1964 — 2 Sheets-Sheet 2
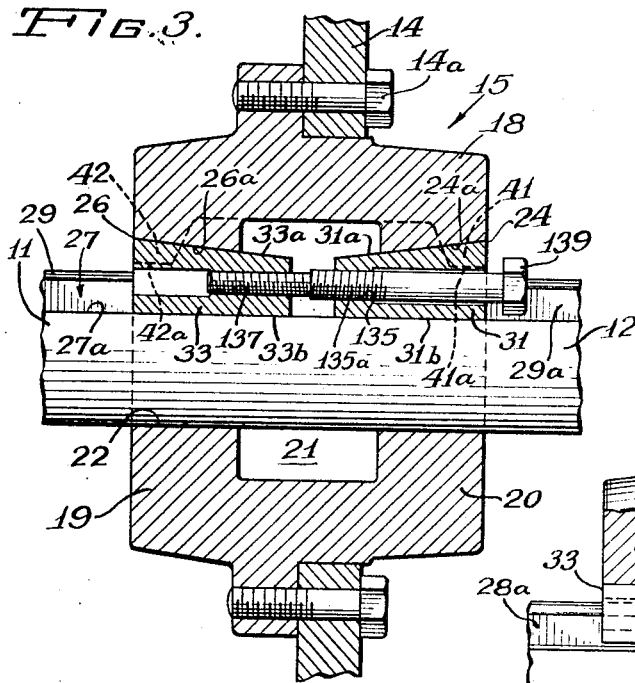
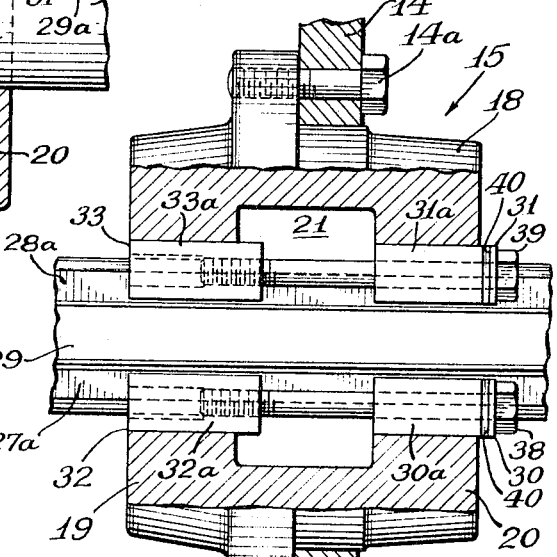
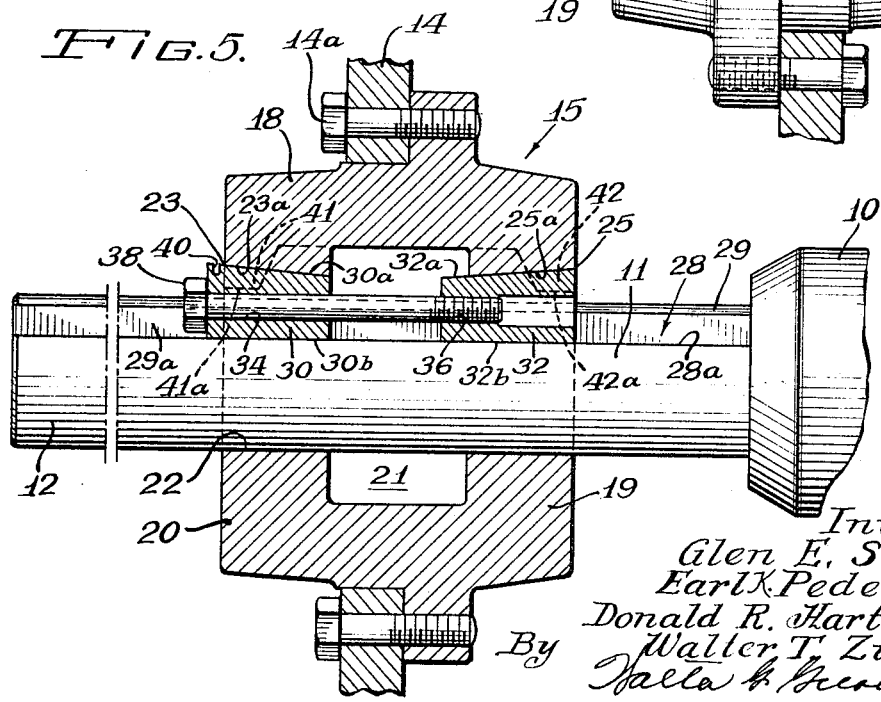
Inventors:
Glen E. Smelcer
Earl K. Pederson
Donald R. Hartdegen
Walter T. Ziolko
By Hala & Gregory Atty.

United States Patent Office 3,279,831
Patented Oct. 18, 1966

3,279,831
TRACTOR WHEEL MOUNTING
Glen E. Smelcer, Hinsdale, Walter T. Ziolko, Willow Springs, Earl K. Pederson, Lombard, and Donald R. Hartdegen, Lockport, Ill., assignors to International Harvester Company, Chicago, Ill., a corporation of New Jersey
Filed Nov. 23, 1964, Ser. No. 412,922
2 Claims. (Cl. 287—52.05)

This invention relates to tractor wheel mounting mechanisms of the type wherein the traction wheels are adjustable to provide tread variation. More particularly, it is concerned with a wheel mounting mechanism that is capable of transmitting drive from an axle shaft to a drive wheel while simultaneously providing a means for fixedly positioning the wheel at any one of a number of preselected axially disposed locations and which mechanism is readily adaptable to agricultural tractors.

As is well known, one of the prerequisites for an agricultural tractor is to be able to vary the tread or wheel spacing thereof in order to permit its use for a variety of purposes. Accordingly, the prior art shows a large variety of mechanisms operable for providing suitable tread adjustability to such tractors but many of the devices heretofore proposed have not been altogether satisfactory either because of their complexity or their inability to transmit large reversible torque loads without causing damage by way of cracking or breaking of the wheels, or because of the difficulty of accomplishing tread variation adjustment under field conditions and then still being able to maintain the selected axial location or the wheel on the axle once the adjustment is accomplished.

Another difficulty inherent in many present wheel clamping devices is the large clamping force required to maintain the axial position under reversible torque with side load. Because of the location of the clamping bolts, the direction and distance a hand wrench has to turn to obtain this large clamping force prohibits a long lever arm, hence it is not always possible to apply adequate torque to properly tighten these clamping bolts particularly on the inner wheel of a dual-wheel assembly.

It is a principal object, therefore, of the present invention to provide a simplified and improved adjustable tractor drive wheel mounting means which is inexpensive to fabricate and is otherwise free of many of the objectionable features of certain prior art devices employed for such purposes.

Another object is to provide an adjustable tractor drive wheel mounting fashioned in the form of a drive mechanism that functions by wedging tapered camming elements between a flat surface on a drive axle and the flat surfaces of oppositely extending axially inclined openings in a drive wheel mounted on the axle.

A further object is to provide means for effecting driving contact between a drive axle and a wheel mounted thereon which includes means for imposing a large tangential force component on the hub of said wheel at a larger radius than said axle can provide.

A still further object is to provide adjustable means for securely positioning a drive wheel at a preselected longitudinally displaced position on an axle, while simultaneously transmitting driving torque between said axle and wheel.

A more general object is to provide a drive mechanism between an axle and a wheel mounted thereon which includes a plurality of sets of engaging complemental surfaces and wherein at least one such set of surfaces also functions to provide clamping means for securely positioning said wheel on the axle at a preselected position.

Another important object is to provide means for transmitting torque between a drive axle and a wheel mounted thereon which includes a plurality of coaxially arranged, axially spaced apart and oppositely tapered members adjustably wedgeable between flat surfaces on the axle and hub of the wheel and wherein said members are wedgingly adjustable from one side of the wheel and in a plane perpendicular to the axis of said wheel whereby resistance to tipping even under heavy side loads or tire hub offset is accomplished.

The foregoing and other objects and features of the invention will become apparent as the disclosure is more fully made in the following detailed description of preferred embodiments of the invention as illustrated in the accompanying sheets of drawings in which:

FIGURE 3 is a view similar to FIGURE 2 but showing a modified form of the adjusting means employed with the invention;

FIGURE 4 is a fragmentary horizontal sectional view taken along the line 4—4 of FIGURE 2; and FIGURE 5 is a vertical sectional fragmentary view taken generally along the line 5—5 of FIGURE 1 and shown on an enlarged scale.

Figure 1:
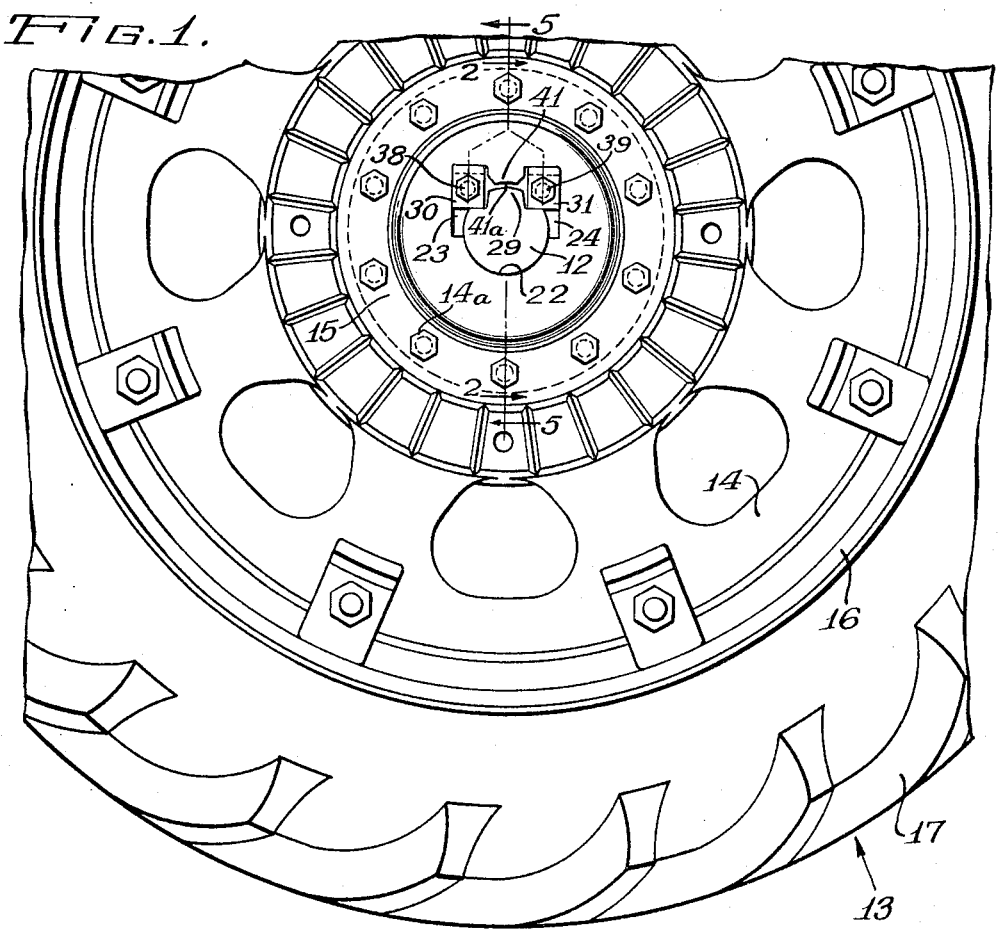
FIGURE 1 is an elevational view of a tractor drive wheel with a drive wheel mounting incorporating a preferred embodiment of the invention therein.
Figure 2:
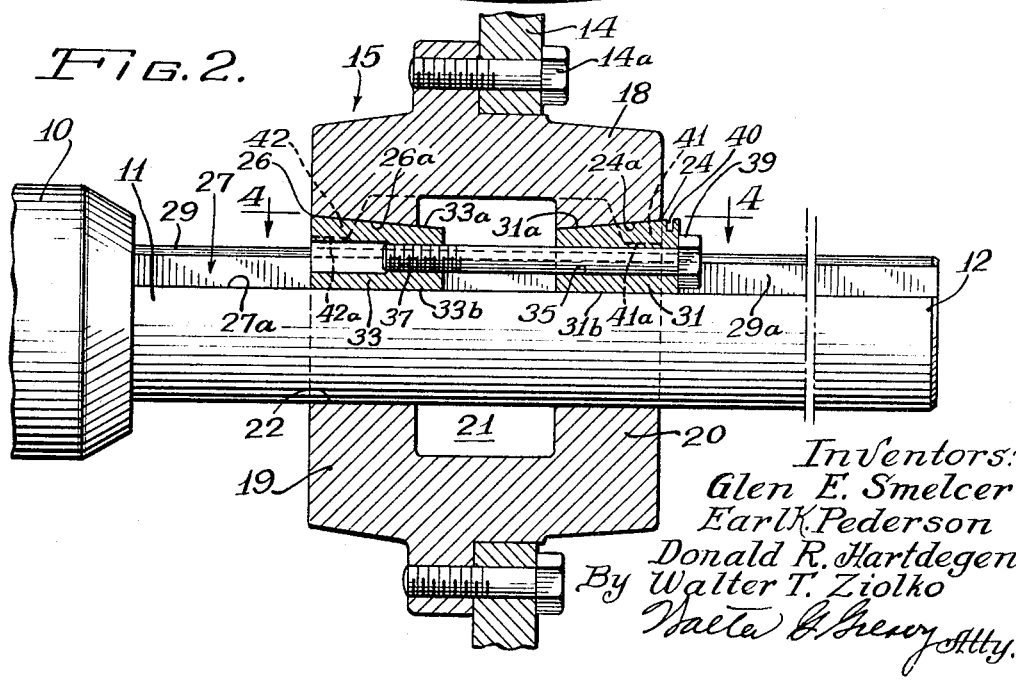
FIGURE 2 is a vertical sectional fragmentary view taken generally along the line 2—2 of FIGURE 1 and shown on an enlarged scale.

Referring now to the drawings it will be seen a rear axle housing of an agricultural tractor, indicated generally by the reference numeral 10, has a drive axle 11 extending therethrough with an end portion 12 projecting outwardly therefrom.

A tractor wheel, indicated in its entirety by the reference numeral 13, includes a central flange or web structure 14 to which is suitably affixed as by the bolts 14a a central hub member such as 15. A tire rim 16 mounted peripherally on said web structure accommodates a pneumatic tire 17 mounted thereon in conventional manner.

The hub 15 is fashioned with a central body portion 18 that interconnects inner and outer wall portions 19, 20 and as arranged provides an interior chamber or cavity 21 therein. The inner and outer wall portions 19, 20 of said hub are provided with coaxial openings that form a bore 22 extending axially therethrough dimensioned to snugly receive the axle end portion 12. A pair of axially extending recesses 23, 24 in outer wall 20 are coaxially aligned in tandem fashion with a similar pair of recesses 25, 26 in inner wall 19. Aligned recesses 23, 25 are disposed to one side of the axial center line of bore 22 while the other aligned recesses 24, 26 are disposed on the opposite side of said center line. The upper surfaces 23a, 24a, 25a, and 26a of the respective recesses are formed at an angle to the longitudinal axis of the bore 22 and all slope downwardly from the outer surface or face of the respective hub wall toward the interior of chamber 21. As thus arranged the recesses 23, 24 in outer wall 20 slope in the opposite direction from the recesses 25, 26 in inner wall 19 for purposes which will presently be more apparent.

The axle end portion 12 is fashioned to provide a pair of longitudinally extending recesses or notches 27, 28 with a tongue or key-like portion 29 of the axle therebetween. The horizontal surfaces 27a, 28a of the respective notches are each finished to provide what is frequently termed a "flat."

A pair of camming members or keys 30, 31 are fashioned with one surface 30a, 31a of each tapered or sloping in the longitudinal dimension only at an angle that corresponds to the slope of complemental surfaces 23a, 24a which they will engage when mated therewith. A second pair of camming members or keys 32, 33 are likewise fashioned with one surface 32a, 33a of each thereof tapered in the longitudinal dimension only at an angle that corresponds to the slope of complemental surfaces 25a, 26a which they will engage. The opposite surfaces 30b, 31b, 32b, 33b of said cam members are flat and parallel with the axis of bore 22. Cam members 30, 32 may be said to form one set while cam members 31, 33 form a second set of tandem cams. In the preferred form of the invention the angle of the slope of the taper on cam members 30, 31 is approximately 7° while the angle of the slope on cam members 32, 33 is approximately 5° although it is conceivable that the angle of the slope on all these members could be identical without deviating from any teachings of the present invention. The reason for this variation in angular slope will presently be better understood as the description proceeds.

Cam members 30, 31 are provided with respective bores 34, 35 therethrough that are coaxial with respective bores 36, 37 in cam members 32, 33. The bores 34, 35 are smoothly finished while the bores 36, 37 may be threaded to receive the respective adjusting bolts 38, 39.

With the wheel positioned on the axle the respective keys or cam members are next positioned in their respective recesses in the outer and inner walls of the wheel hub and then the adjusting bolts are threaded into the threaded bores in the respective cam members. Now, when bolts 38, 39 are tightened cam members 30, 31 in outer wall 20 and cam members 32, 33 in inner wall 19 are moved axially inwardly thus the cams of each tandem set are pulled or forced toward one another. This action forces surfaces 30a, 31a of cam members 30, 31 into contacting engagement with surfaces 23a, 24a of recesses 23, 24, while surfaces 30b, 31b of said cams engage portions of the respective surfaces 28a, 27a of axle 12. At the same time surfaces 32a, 33a of cam members 32, 33 are brought into contacting engagement with surfaces 25a, 26a of recesses 25, 26, while surfaces 32b, 33b of the latter cams engage portions of the respective surfaces 28a, 27a of axle 12. It will be seen therefore that this action has the effect of forcing the cam members into a tight drive transmitting and clamping relation between the axle and the wheel hub. To disengage the cam members from their tight drive transmitting relation the adjusting bolts 38, 39 are turned in a direction opposite that for tightening then the heads thereof are tapped to drive the bolts inwardly to dislodge cam members 32, 33 in the inner wall 19 of hub 15. Slots 40, 40 in cam members 30, 31 provide means for receiving a tool such as a pinch bar to subsequently loosen the latter cam members. The hub portions remaining between recesses 23 and 24 and between recesses 25 and 26 after the respective recesses have been fashioned provide the respective tongue-like pads 41 and 42 which have axially extending surfaces 41a and 42a substantially conforming to the curvature of axle 12 but slightly spaced radially therefrom when the wheel is in its tightly clamped postion. Preferably, the recesses 23, 24, 25 and 26 each has a portion thereof that extends a short distance beyond or to one side of the axial center line of bore 22 to enable said bore to snugly receive axle end portion 12 and still permit axial adjustment by rocking of hub wheel assembly 13 on pad surfaces 41a, 42a when the camming elements are slightly withdrawn. Thus the pads 41 and 42 also provide a stop for the wheel so the cam members need only be loosened until said pads contact and carry the weight of the wheel on the axle after which the wheel may be rocked through a small angle in the vertical plane of the axle on the axle and on pads 41 and 42 to move it to a different position for changing the tread spacing.

In FIGURE 3 there is illustrated one tandem set only of cams using another form of adjusting means suitable for application in the proposed invention. In this embodiment the cam members are substantially identical with the previously described embodiment except for the bores therein. In this modified form bore 135 in cam member 31 is fashioned with left hand threads. Bolt 139 is fashioned, as before, with the inboard end thereof having a right hand thread while the intermediate portion 135a thereof is provided with left hand threads. Now when bolt 139 is turned in one direction the oppositely acting threads thereon will cause the cam members of this tandem set to be pulled inwardly toward one another thereby forcing the cam members into a tight drive transmitting and clamping relation, but when said bolt is turned in the opposite direction the oppositely acting threads will cause the cam members of the set to spread away from one another thereby loosening their drive transmitting relation, with the cam member 31, because of its 7° taper, being forced loose first after which a tap on the head of bolt 139 serves to dislodge the 5° taper cam member 33 thereby loosening the drive transmitting relation of the mechanism.

Although one preferred application of the present invention suggests the use of two tandem sets of cam members and two such members in each set with the sets disposed one each on opposite sides of the diametral or center line of the axle and wheel, it is conceivable that only one such tandem set of cam members might be used, such as when small torque loads are involved, or, again. for manufacturing economy, one such tandem set of cam members might be used with a solid key cast in place in the hub to replace the second tandem set of cam members on the opposite side of the diametral or center line of the axle for a drive which has low-torque reversals. In such instances it is envisaged that the modifications would still be embraced by the teachings of the present invention.

It should now be apparent that a novel, adjustable wheel mounting means has been shown and described, and wherein the camming members are loaded in compression in preload and under torque load instead of in shear as in many conventional key devices, and it is to be understood that changes may be made in the construction without departing from the spirit of the invention or the scope thereof as defined in the appended claims.

What is claimed is:

1. A wheel and axle assembly comprising: an axle having an outwardly extending end portion; a wheel having a hub with a central bore snugly receiving the axle; means formed in said hub providing a first set of coaxial recesses extending axially inwardly one each from an opposite side of said hub and having a wall surface in each recess inclined relative to the axle, and a second set of coaxial recesses extending axially inwardly one each from an opposite side of said hub and having a wall surface in each recess inclined relative to the axle, said first and second sets of recesses being spaced from and disposed one set on each side of the diametral center line of said hub; means forming a plurality of peripherally spaced and axialy extending recesses in said axle; drive transmitting means interposed between said hub recesses and said axle recesses including first and second sets of elongated key members tapered in one dimension only along the longitudinal axis of each key member and disposed with one set of said members in said first set of coaxial recesses and another set of said members in said second set of coaxial recesses and extending into respective ones of the axially extending recesses in said axle; a plurality of adjustable means with one of such plurality cooperative between a first set of key members and another of such plurality cooperative between a second set of key members for slidably urging the respective key members of each set axially toward one another and into a tight drive transmitting relation between said axle and said hub; said hub being fashioned to provide between said first and second sets of coaxial recesses axially extending pad-like projections having inner surfaces contoured to conform with the curvature of said axle and normally spaced therefrom; and having each of the recesses of said first and second sets of coaxial recesses provided with a portion that extends beyond an extension of the diametral center line of the axle whereby when the key members are loosened the axle is loosely received in said hub bore thereby permitting the wheel to be rocked on said pad-like projections through a small angle in the vertical plane of the axle to effect axial movement of the wheel.

2. A wheel and axle assembly comprising: an axle having an outwardly extending end portion; a wheel having a hub with a central bore snugly receiving the axle; means formed in said hub providing a first set of axially spaced coaxial recesses extending inwardly one each from an opposite side of said hub and having a wall surface in each recess inclined relative to the axle with the angle of inclination of the surface on an outboard side of said hub being larger than that of the surface on an inboard side of said hub, and a second set of axially spaced coaxial recesses extending axially inwardly one each from an opposite side of said hub and having a wall surface means recess inclined relative to the axle with the angle of inclination of the surface on an outboard side of said hub being larger than that of the surface on an inboard side of said hub, said first and second sets of recesses being spaced from and disposed one set on each side of the diametral center line of said hub; means forming a plurality of peripherally spaced and axially extending recesses in said axle; drive transmitting means interposed between said hub recesses and said axle recesses including first and second sets of elongated key members tapered in one dimension only along the longitudinal axis of each key member and disposed with one set of said members in said first set of coaxial recesses and another set of said members in said second set of coaxial recesses and extending into respective one of the axially extending recesses in said axles, and having the angle of inclination of the tapered surface of each of said key members fashioned to correspond with the angle of inclination of the complemental surface in the coaxial recess in which each said key member is disposed; said key members being fashioned with coaxially extending bores and having one of said bores of each set provided with right-hand threads and the other bore of each set being provided with left-hand threads therein, first and second bolt means each including a shank having right- and left-hand threaded portions therein, said bolt means being threadably received one each in said threaded bores with the right-hand threaded portion engaging the respective right-hand threaded bore and the left-hand threaded portion engaging the respective left-hand threaded bore whereby upon turning of each said bolt means in one direction the key members of each respective set are urged axially toward one another and into a tight drive transmitting relation between said axle recesses and the respective hub recesses.

References Cited by the Examiner
UNITED STATES PATENTS

| | | | |
|---|---|---|---|
| 198,481 | 12/1877 | Woodbury | 287—52.05 |
| 1,436,347 | 11/1922 | Krider | 287—52.09 X |
| 2,524,903 | 10/1950 | Firth | 287—52.06 |

FOREIGN PATENTS

| | | |
|---|---|---|
| 138,651 | 9/1950 | Australia. |
| 162,467 | 3/1949 | Austria. |
| 1,192,621 | 4/1959 | France. |
| 656,106 | 8/1951 | Great Britain. |
| 706,999 | 4/1954 | Great Britain. |
| 851,091 | 10/1960 | Great Britain. |

BENJAMIN HERSH, *Primary Examiner.*

R. J. JOHNSON, *Assistant Examiner.*